United States Patent
Tanaka et al.

(10) Patent No.: US 9,531,950 B2
(45) Date of Patent: Dec. 27, 2016

(54) IMAGING SYSTEM AND IMAGING METHOD THAT PERFORM A CORRECTION OF ELIMINATING AN INFLUENCE OF AMBIENT LIGHT FOR MEASUREMENT DATA

(71) Applicant: FUJIFILM Corporation, Tokyo (JP)

(72) Inventors: Yasutake Tanaka, Ashigarakami-gun (JP); Akira Yamaguchi, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 52 days.

(21) Appl. No.: 14/632,249

(22) Filed: Feb. 26, 2015

(65) Prior Publication Data
US 2015/0264257 A1 Sep. 17, 2015

(30) Foreign Application Priority Data

Mar. 13, 2014 (JP) ................................ 2014-050526

(51) Int. Cl.
*H04N 5/232* (2006.01)
*H04N 5/235* (2006.01)
(Continued)

(52) U.S. Cl.
CPC ...... *H04N 5/23229* (2013.01); *H04N 1/00997* (2013.01); *H04N 1/407* (2013.01); *H04N 5/2354* (2013.01)

(58) Field of Classification Search
CPC H04N 5/23229; H04N 1/00997; H04N 1/407; H04N 5/2352; A61B 6/06
(Continued)

(56) References Cited

U.S. PATENT DOCUMENTS 4,656,650 A * 4/1987 Kikuchi ................... H04N 5/32
348/E5.086
4,741,009 A * 4/1988 Yamagata ................ A61B 6/06
378/98.12
(Continued)

FOREIGN PATENT DOCUMENTS

EP 0 218 923 A2 4/1987
JP 9-44636 A 2/1997
(Continued)

OTHER PUBLICATIONS

Extended European Search Report, dated Jul. 27, 2015, for European Application No. 15155343.5.
(Continued)

*Primary Examiner* — Nhan T Tran
(74) *Attorney, Agent, or Firm* — Birch, Stewart, Kolasch & Birch, LLP (57) ABSTRACT

An imaging system using a transmission light source unit includes a sensor unit (imaging unit) that detects light emitted from a light source unit, a storage unit that stores correction data for eliminating the influence of ambient light, and a signal processing unit that performs correction for eliminating the influence of ambient light on measurement data, which is obtained by measurement using a subject, based on the correction data. The correction data is calculated based on a difference between first reference data obtained by imaging in a state where a light shielding plate having an opening is disposed between the light source unit and the sensor unit and second reference data obtained by imaging in a state where no light shielding plate is disposed.

13 Claims, 6 Drawing Sheets

(51) Int. Cl.
*H04N 1/40* (2006.01)
*H04N 1/407* (2006.01)
*H04N 1/00* (2006.01)

(58) Field of Classification Search
USPC ........................................ 348/241, 370, 335
See application file for complete search history.

(56) References Cited

U.S. PATENT DOCUMENTS

2005/0052651 A1* 3/2005 Kim ...................... G03F 7/7085
356/433
2011/0249939 A1* 10/2011 Schmidt ............... G02B 6/0041
385/39

FOREIGN PATENT DOCUMENTS

JP         09044636 A * 2/1997 ............... H04N 1/19
JP         10-142053 A    5/1998

OTHER PUBLICATIONS

Yaeli, "Stray Light Measurement for Imaging Systems," Optical Engineering, Jan. 1988, vol. 27, No. 1, pp. 86-87.

* cited by examiner

IMAGING SYSTEM AND IMAGING METHOD THAT PERFORM A CORRECTION OF ELIMINATING AN INFLUENCE OF AMBIENT LIGHT FOR MEASUREMENT DATA

CROSS-REFERENCE TO RELATED APPLICATIONS

The present application claims priority under 35 U.S.C. §119 to Japanese Patent Application No. 2014-050526, filed on Mar. 13, 2014. Each of the above application(s) is hereby expressly incorporated by reference, in its entirety, into the present application.

BACKGROUND OF THE INVENTION

1. Field of the Invention

The present invention relates to an imaging system and an imaging method for imaging a transparent document, such as a film, or a sample with a shade.

2. Description of the Related Art

A document reader that reads a transparent document, such as a film, using a transmission light source is known. In addition, as an apparatus having the same function, there is an imaging system that images a sample with a shade (for example, an electrophoretic gel). Such an imaging system is indispensable when identifying and quantifying biomolecules, especially, proteins or nucleic acids by image analysis.

In a known imaging system using such a transmission light source, there is a problem of ambient light caused by diffusion of illumination light, irregular reflection in the apparatus, and the like. For example, JP1997-44636A (JP-H09-44636A) discloses a correction method for eliminating the influence of light leakage from measurement data by covering a part of an imaging device (CCD) with a light shielding plate and subtracting the signal value detected in pixels (correction pixels) in the covered region from the signal value detected in imaging pixels. In addition, JP1998-142053A (JP-H10-142053) discloses a spectral reflectance measurement apparatus in which the spectral reflectance obtained by measuring a color chart is corrected with the use of the flare spread function.

SUMMARY OF THE INVENTION in the method disclosed in JP1997-44636A (JP-H09-44636), however, the number of imaging pixels is reduced since some pixels of the imaging device are used as correction pixels. For this reason, there is a problem that the imaging region of the imaging device is reduced.

The invention has been made in view of the above problem, and it is an object of the invention to provide an imaging system and an imaging method capable of suppressing the influence of ambient light without reducing the imaging region of an imaging device in an imaging system using a transmission light source.

In order to solve the above-described problem, a first imaging system according to an aspect of the claimed invention is an imaging system that images a subject by irradiating the subject with light and detecting light transmitted through the subject, and includes: a light source unit; a sensor unit configured to detect light emitted from the light source unit; a storage unit configured to store first correction data calculated based on a difference between first reference data and second reference data, the first reference data being detected by emitting the light with a light shielding plate having an opening placed between the light source unit and the sensor unit and being detected in an opening corresponding region, which is a region of a detection surface of the sensor unit corresponding to the opening of shielding plate, the second reference data being detected in the opening corresponding region by emitting the light without placing the light shielding plate; and a signal processing unit configured to perform first correction of eliminating an influence of ambient light for measurement data, which is obtained by measurement using the subject, based on the first correction data.

On the other hand, a second imaging system according to an aspect of the claimed invention is an imaging system that images a subject by irradiating the subject with light and detecting light transmitted through the subject, and includes: a light source unit; a sensor unit configured to detect light emitted from the light source unit; a storage unit configured to store third reference data as first correction data, the third reference data being detected by emitting the light with the light shielding plate for shielding a part of a detection surface of the sensor unit placed between the light source unit and the sensor unit and being detected in a shielding corresponding region, which is a region in the detection surface corresponding to the light shielding plate; and a signal processing unit configured to perform first correction of eliminating an influence of ambient light for measurement data, which is obtained by measurement using the subject, based on the first correction data.

In the imaging system according to the aspect of the claimed invention, the storage unit may store a plurality of pieces of the first correction data corresponding to divided regions of a plate on which the subject is placed, and the signal processing unit may perform the first correction for each piece of the measurement data obtained in the divided regions.

In the imaging system of the according to the aspect of claimed invention, the storage unit may further store second correction data for correcting light intensity distribution according to an irradiation position of the light, and the signal processing unit may perform second correction of eliminating an influence of the light intensity distribution for the measurement data based on the second correction data before the first correction.

In addition, the first imaging system according to the aspect of the invention may further include the light shielding plate. In this case, the light shielding plate may have a plurality of openings.

In the imaging system according to the aspect of the claimed invention, the light source unit may include a light source that emits the light sideways with respect to a direction of the detection surface, a reflective diffusion plate that reflects and diffuses the light emitted from the light source toward the sensor unit, and a transmissive diffusion plate disposed between the reflective diffusion plate and the sensor unit.

In the imaging system according to the aspect of the claimed invention, the light source unit may include a light source that emits the light toward the detection surface and a transmissive diffusion plate provided between the light source and the sensor unit. In this case, the light source may be an ultraviolet light source, and the light source unit may include a conversion plate that converts ultraviolet light into visible light, the conversion plate being provided between the light source and the transmissive diffusion plate.

In the imaging system according to the aspect of the claimed invention, the signal processing unit may calculate an optical density of the subject based on measurement data for which the first correction has been performed.

In the imaging system according to the aspect of the claimed invention, the light source unit may emit three or more kinds of the light having different wavelengths, and the signal processing unit may generate color data or a color image of the subject by combining measurement data obtained using the respective light beams.

A first imaging method of according to still another aspect of the invention is an imaging method for imaging a subject by irradiating the subject with light and detecting light transmitted through the subject, and includes performing first correction of eliminating an influence of ambient light for measurement data, which is obtained by measurement using the subject, based on first correction data calculated based on a difference between first reference data and second reference data, the first reference data being detected by emitting light form the light source with a light shielding plate having an opening placed between the light source unit and the sensor unit and being detected in an opening corresponding region, which is a region in a detection surface of the sensor unit corresponding to the opening of the shielding plate, the second reference data being detected in the opening corresponding region by emitting the light without placing the light shielding plate.

On the other hand, a second imaging method according to still another aspect of the invention is an imaging method for imaging a subject by irradiating the subject with light and detecting light transmitted through the subject, and includes performing first correction of eliminating an influence of ambient light for measurement data, which is obtained by measurement using the subject, based on first correction data that is third reference data detected by emitting the light from a light source unit with the light shielding plate for shielding a part of a detection surface of a sensor unit placed between the light source unit and the sensor unit and being detected in a shielding corresponding region, which is a region in the detection surface corresponding to the light shielding plate.

The imaging method according to the aspect of the invention may further include calculating the first correction data. In this case, a plurality of pieces of the first correction data may be calculated corresponding to divided regions of a plate on which the subject is placed, and the first correction may be performed for each piece of the measurement data obtained in the divided regions.

In the imaging method according to the aspect of the invention, when acquiring the first and second reference data, a semi-light shielding plate having a known optical density may be provided at a position corresponding to the opening corresponding region.

In the imaging method according to the aspect of the invention, second correction of eliminating an influence of light intensity distribution may be performed on the measurement data based on second correction data for correcting the light intensity distribution according to an irradiation position of the light, and the first correction may be performed on the measurement data for which the second correction has been performed.

In the imaging system and the imaging method according to the aspects of the claimed invention, correction for eliminating the influence of ambient light is performed on measurement data based on correction data calculated before the imaging of the subject. Therefore, some pixels of the imaging device do not need to be used as correction pixels. As a result, in the imaging system using the transmission light source, it is possible to suppress the influence of ambient light without reducing the imaging area on the imaging device.

DESCRIPTION OF THE PREFERRED EMBODIMENTS

Hereinafter, embodiments of the invention will be described with reference to the accompanying diagrams. However, the invention is not limited to these. In addition, the scale of each component is appropriately adjusted in order to have a recognizable size in the diagrams described below.

First Embodiment

Figure 1:
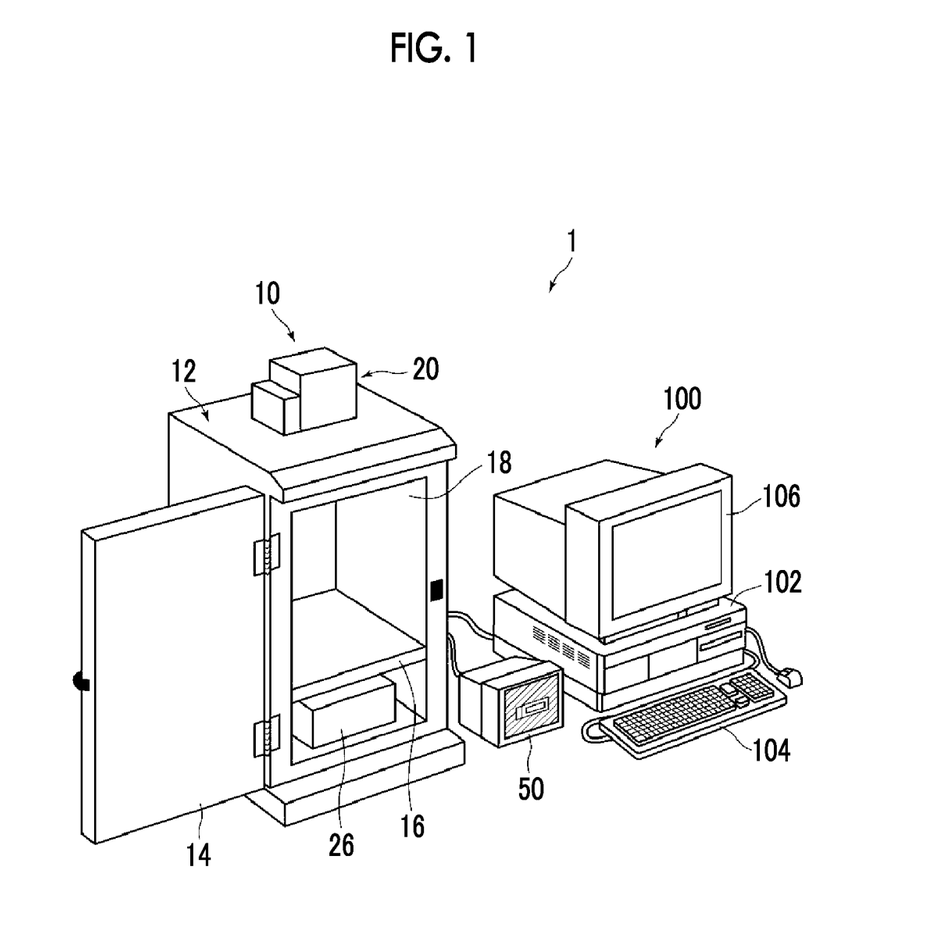
FIG. 1 is a schematic perspective view showing an imaging system according to a first embodiment.
Figure 2:
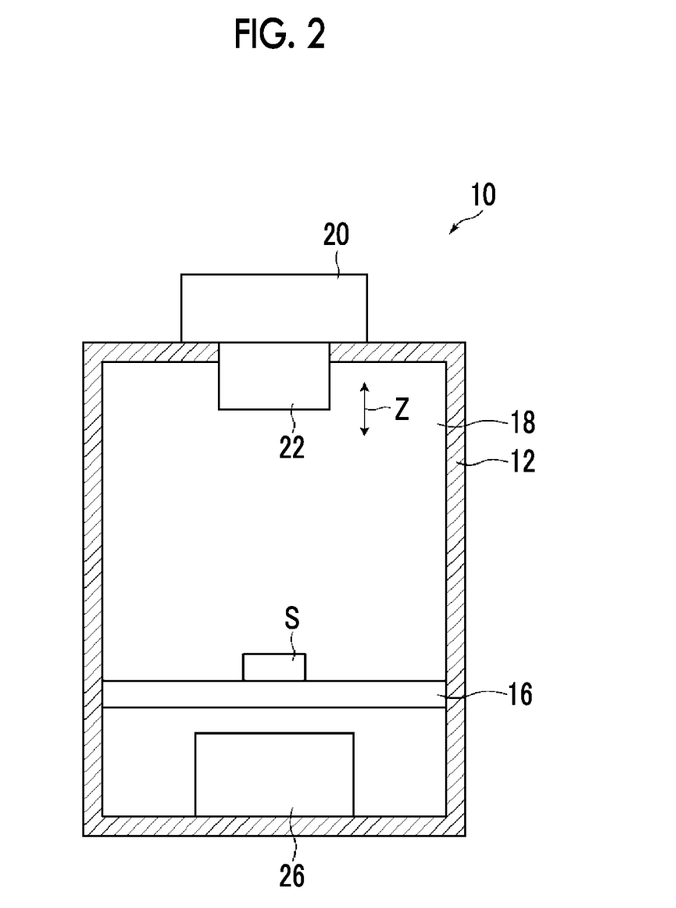
FIG. 2 is a schematic cross-sectional view showing the internal configuration of an imaging apparatus according to the first embodiment.
Figure 3:
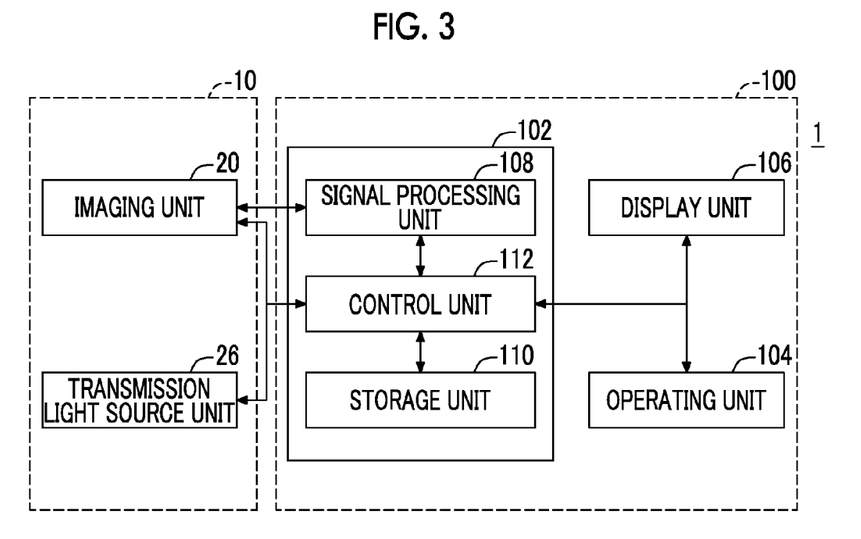
FIG. 3 is a schematic block diagram showing the imaging system according to the first embodiment.

An imaging system and an imaging method according to a first embodiment of the invention will be described. FIG. 1 is a schematic perspective view showing the imaging system according to the first embodiment. FIG. 2 is a schematic cross-sectional view showing the internal configuration of an imaging apparatus according to the first embodiment. FIG. 3 is a schematic block diagram showing the imaging system according to the first embodiment.

As shown in FIGS. 1 and 2, an imaging system 1 according to the present embodiment is configured to include an imaging apparatus 10 and an imaging control device 100. For example, the imaging apparatus 10 includes a housing 12 having a lid 14, a stage 16 on which a subject S is placed, an imaging unit 20, a lens unit 22, a transmission light source unit 26, and a subject observation monitor 50. On the other hand, the imaging control device 100 is, for example, a personal computer, and includes a control device body 102, an operation unit 104, and a display unit 106. The imaging apparatus 10 images the subject S under the control of the imaging control device 100, and transmits the acquired signal information to the imaging control device 100. The imaging control device 100 converts the signal information into image data, and stores the image data in a storage unit or displays the image data on the display unit 106. The imaging system 1 is used to read a transparent document or to measure the optical density of a sample, for example. The imaging system 1 may include a light shielding plate, which will be described later, or an epi-light source unit when necessary.

The housing 12 has a hollow portion 18 formed in an approximately rectangular parallelepiped shape, and has the stage 16 on which the subject S is placed. The lid 14 shown in FIG. 1 is attached to the housing 12 so as to be able to be opened and closed. Accordingly, the user can place the subject S in the housing 12 by opening the lid 14 to place the subject S on the stage 16 and then closing the lid 14. The housing 12 forms a dark box having the hollow portion 18 on which outside light is not incident. The stage 16 has a light transmission property for making light from the transmission light source unit 26 be transmitted therethrough.

The imaging unit 20 is fixed to the upper surface of the housing 12, and includes an imaging device, for example, a charge coupled device (CCD). The imaging unit 20 detects light in the housing 12 and generates an electric signal. The generated electric signal is transmitted to a signal processing unit 108 after amplification processing, for example. The imaging unit 20 corresponds to a sensor unit in the invention. The imaging unit 20 includes a cooling device. By cooling the imaging device, a situation where noise components due to a dark current are contained in the captured signal information is prevented. The lens unit 22 is attached to the imaging unit 20.

The lens unit 22 includes a plurality of lenses, for example. In order to focus on the subject S, each lens is provided so as to be movable in a direction of arrow Z. The lens unit 22 also includes optical elements, such as a diaphragm and an excitation light cut filter, and adjusts the amount of detected light or the wavelength of detected light.

The transmission light source unit 26 includes, for example, an excitation light source for fluorescence imaging (ultraviolet light source) and a white light source, and is configured to perform light source switching under the control of the imaging control device 100 when necessary. That is, in the present embodiment, the imaging system 1 has a configuration that can also be applied to fluorescence imaging. For example, when performing imaging for detecting fluorescence from a fluorescently labeled subject, excitation light from the transmission light source unit 26 is emitted to the subject S. Alternatively, when performing imaging for detecting transmissive light that has been transmitted through the subject, white light from the transmission light source unit 26 is emitted to the subject S.

The subject observation monitor 50 displays a state on the stage 16 imaged by a compact camera (not shown) provided in the upper portion of the housing 12. Therefore, it is possible to check the position of the subject S placed on the stage 16 or the height of the stage 16 and to adjust the position of the subject or the height of the stage so that the arrangement of the subject S is suitable for imaging.

The control device body 102 includes the signal processing unit 108, a storage unit 110, and a control unit 112, for example. The signal processing unit 108 generates image data based on the electric signal generated by the imaging unit 20, and performs signal processing (for example, noise removal processing or sharpness processing) required for the image data. The storage unit 110 stores information required for imaging. In particular, in the present embodiment, the storage unit 110 stores correction data that is used for the correction of measurement data. Details of the correction data will be described later. The control unit 112 is, for example, a computer including a CPU, a ROM, and the like. The imaging unit 20, the transmission light source unit 26, the signal processing unit 108, the storage unit 110, the operation unit 104, and the display unit 106 are connected to the control unit 112, and the control unit 112 performs overall control of each unit.

The display unit 106 is a display device, such as a CRT or a liquid crystal display, and displays image data generated by the signal processing unit 108. The display unit 106 also displays a setting screen for performing various kinds of setting for the imaging apparatus 10 or giving an instruction to the imaging apparatus 10.

The operation unit 104 is configured to include a user interface, such as a mouse or a keyboard. The user operates the operation unit 104 to perform various kinds of setting for the imaging apparatus 10 or give an instruction to the imaging apparatus 10. For example, the user sets information regarding imaging, such as the type of a subject and the type of an imaging method, in the imaging system through the operation unit 104. The input information is stored in the storage unit 110, for example.

Correction data stored in the storage unit 110 will be described. There are two types of correction data. One is correction data (first correction data) used for first correction (ambient light removal correction) to eliminate the influence of ambient light from measurement data, and the other one is correction data (second correction data) used for second correction (flat frame correction) to eliminate the influence of light intensity distribution according to the irradiation position of illumination light.

Figure 4A:
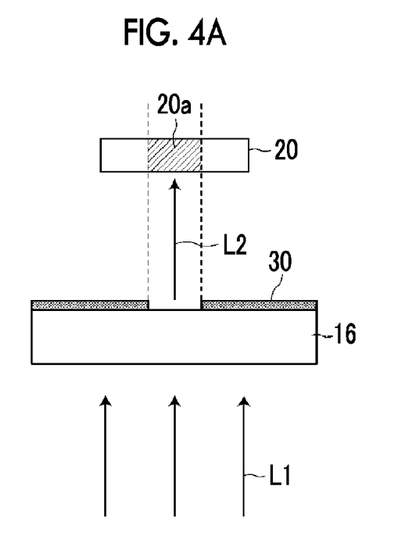
FIGS. 4A and 4B are schematic diagrams showing how to acquire the first and second reference data.
Figure 4B:
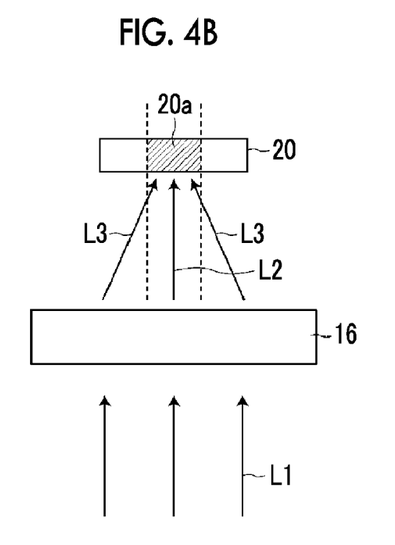

The first correction data is data indicating the amount of a signal originated from ambient light included in a detection signal or data indicating how many of the signals originated from ambient light is included, for example. Such correction data can be obtained as follows, for example. First, as shown in FIG. 4A, a light shielding plate 30 (for example, FIG. 7A) having an opening is disposed on the stage 16 without placing a subject. The light shielding plate 30 has a size that can cover the entire stage 16 excluding the opening portion. When illumination light (white light) L1 from the transmission light source unit 26 is emitted to the stage 16 in a state where the light shielding plate 30 is disposed on the stage 16, light only passes through the opening. Light L2 having passed through the opening is detected in a pixel region corresponding to the opening of the imaging unit 20 (in other words, a region where the light L2 having passed through the opening is detected). Hereinafter, the pixel region corresponding to the opening of the imaging unit 20 is referred to as an opening corresponding region 20a (refer to FIG. 4A). In this case, in the opening corresponding region 20a, a signal (first reference data) of only the light L2 having passed through the opening is detected. The lens unit 22 is not shown in FIGS. 4A and 4B. Then, as shown in FIG. 4B, the light shielding plate 30 is removed and the illumination light L1 is emitted in a state where there is no light shielding plate 30, and a signal (second reference data) in this case is detected. The second reference data includes not only the signal of the light L2 having passed through a region where there is an opening but also a signal originated from light L3 (ambient light) having passed through a region covered with the light shielding plate 30. When acquiring the first and second reference data, a semi-light shielding member having a known optical density (for example, a light shielding film having an optical density of about 3.0) may be disposed at the opening position. This is because the intensity of the light L2 having passed through the opening is too strong if nothing is disposed, and accordingly, it is difficult to extract the influence of ambient light.

Therefore, assuming that the signal strength of the first reference data is $I_1$ and the signal strength of the second reference data is $I_2$, it is possible to obtain the amount of a signal originated from ambient light included in measurement data, which is obtained by imaging the subject with the same amount of illumination light, by setting the value of the first correction data to $I_2-I_1$. In addition, by setting the value of the first correction data to $(I_2-I_1)/I_2$, it is possible to obtain the ratio of the amount of a signal originated from ambient light included in measurement data obtained by imaging the subject. For example, when the detection signal value at the time of imaging (main imaging) of the subject is I, if the first correction data $I_a$ is given by $I_a=I_2-I_1$, the actual signal value $I_r$ after eliminating the influence of ambient light can be calculated by $I_r=I-I_a$. If the first correction data $R_a$ is given by $R_a=(I_2-I_1)/I_2$, the actual signal value $I_r$ after eliminating the influence of ambient light can be calculated by $I_r=I(1-R_a)$. As the reference data or the first correction data, for example, an average value in a pixel group belonging to the opening corresponding region may be adopted, or a mode in such a pixel group may be adopted.

Figure 5:
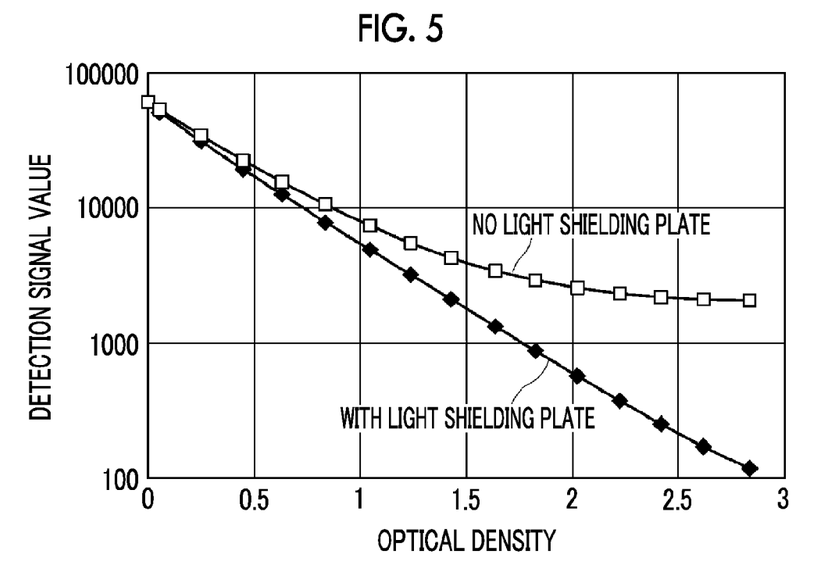
FIG. 5 is a graph showing a result when the optical density of a sample is estimated to be lower than the actual value due to the influence of ambient light.

In practice, light (that is, ambient light, such as diffused light or irregularly reflected light) other than the simply transmitted light is detected by the imaging unit 20. Accordingly, since the higher signal value than the original value is estimated, an error occurs. For example, FIG. 5 is a graph showing a result when the optical density of a sample is estimated to be lower than the actual value due to the error described above. The horizontal axis of the graph indicates the optical density of a reference film, and the vertical axis indicates an actual signal value in each measurement performed under different conditions. The graph of "with a light shielding plate" corresponds to a case where the influence of ambient light is eliminated as much as possible by covering the periphery of a film with a light shielding plate, and the graph of "no light shielding plate" corresponds to a case where the influence of ambient light is large since such a light shielding plate is not used. This graph shows that the influence of ambient light increases as the optical density increases.

Figure 6:
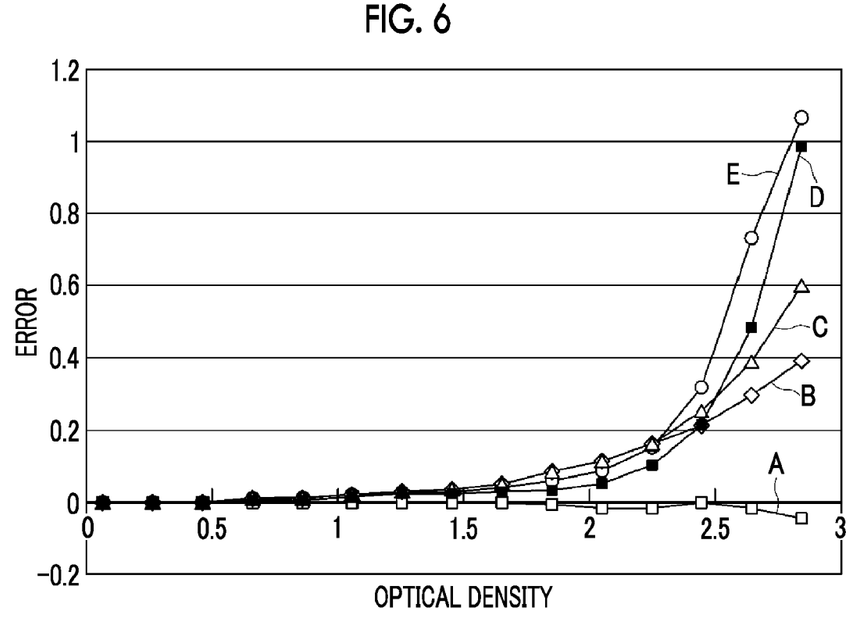
FIG. 6 is a graph showing the location dependency of correction.

In the first correction data, a value acquired in a region (or a pixel) where there is an imaging device can also be used in other regions (or other pixels). However, the magnitude of the influence of ambient light has a location dependency on the stage 16. Therefore, it is preferable that the area on the stage 16 is divided into several regions and the storage unit 110 has first correction data for each of the divided regions. For example, FIG. 6 is a graph showing the location dependency of correction. More specifically, the graph shows a result when signal values detected in a region near the center of the stage 16 and four other regions located in front, rear, left, and right sides of the region near the center of the stage 16 are corrected by the first correction data calculated for the region near the center of the stage 16. In the graph, A shows a correction result of the central region for which the correction data has been calculated, and B to E show correction results of the left region, the right region, the rear region, and the front region, respectively. From this graph, it can be seen that correction is properly performed in the central region for which the correction data has been calculated but the optical density is estimated to be higher (over-correction) as the value increases in the other regions. Presumably, this is because the wall of the housing 12 is close to the four regions other than the central region and accordingly the influence of ambient light in the central region is not large. As described above, since the magnitude of the influence of ambient light has a location dependency on the stage 16, it is preferable to perform ambient light removal correction for each divided region using the first correction data calculated in each divided region.

Figure 7A:
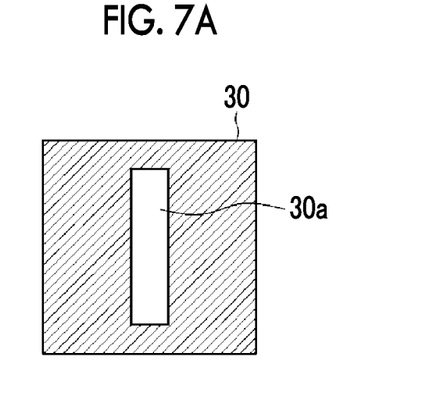
FIGS. 7A to 7C are schematic diagrams showing examples of the configuration of a light shielding plate.
Figure 7B:
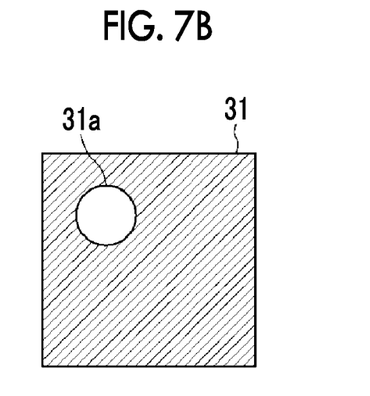
Figure 7C:
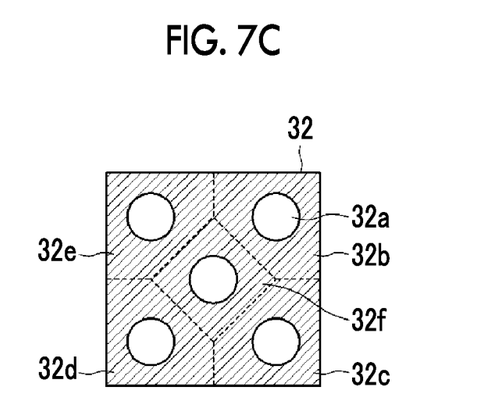

The light shielding plate used when acquiring the first reference data is not particularly limited as long as the light shielding plate is a light shielding member having an opening corresponding to a region for which ambient light removal correction is performed. As the size and shape of the opening, a rectangular shape of tens of mm×tens of mm (length of one side is 10 to 30 mm) or a circular shape with a diameter of tens of mm (for example, 10 to 30 mm) is a measure. However, the size and shape of the opening may be changed from the above range according to the imaging conditions or when necessary. FIGS. 7A to 7C are schematic diagrams showing examples of the configuration of the light shielding plate. The light shielding plate 30 shown in FIG. 7A has a size to cover the stage 16, and includes a rectangular opening 30a. A light shielding plate 31 shown in FIG. 7B has a size to cover the stage 16, and includes a circular opening 31a located at a position shifted from the center of the substrate. For example, if the light shielding plate 31 is rotated by 90°, 180°, and 270° and reference data is acquired by imaging at each of the angles, the area on the stage 16 is divided into four parts. Accordingly, it is possible to acquire four pieces of first reference data (that is, four pieces of first correction data) corresponding to the respective divided regions. A light shielding plate 32 shown in FIG. 7C has a size to cover the stage 16, and includes five circular openings 32a (one located at the center of the light shielding plate 32 and the others located at the vertices). Thus, if openings are separated from each other to the extent that the influence of ambient light is not caused, it is possible to provide a plurality of openings in one light shielding plate. If such a light shielding plate is used, five pieces of first reference data (that is, five pieces of first correction data) corresponding to divided regions 32b to 32f can be acquired by one imaging.

Second correction data is a flat frame indicating what kind of distribution the light intensity of illumination light has on the stage 16, for example. It is possible to perform flat frame correction by dividing the first and second reference data, or the first correction data, or the measurement data of main imaging using the flat frame. As such a foot frame, it is possible to use image data obtained by imaging in a state where nothing is placed on the stage 16.

Next, the procedure of the imaging method according to the present embodiment will be described. First, the user checks whether or not there is suitable correction data for the imaging conditions, the type of a subject, or the like. When there is suitable correction data, the correction data is used. On the other hand, when there is no correction data, the user starts an operation of creating correction data.

When creating correction data, first, the user turns on the transmission light source unit 26 in a state where nothing is placed on the stage 16, performs imaging by applying illumination light, and acquires the light intensity $I_0$ of the illumination light itself as image data. The image data is used when calculating the optical density later, and can also be used as a flat frame. Then, the user places, for example, the light shielding plate 30 on the stage and applies illumination light in a state where a light shielding film is disposed so as to fit the opening of the light shielding plate 30, thereby acquiring first reference data $I_1$. In this case, flat frame correction is performed for the first reference data. Then, the user removes the light shielding plate 30, and acquires second reference data $I_2$ by applying illumination light in a state where the position of the light shielding film is maintained as it is. Also for the second reference data, flat frame correction is performed in the same manner as described above. Then, $I_a=I_2-I_1$ is stored in the storage unit 110 as the first correction data.

Then, the process proceeds to main imaging. The user places a subject on the stage 16, applies illumination light to acquire measurement data I, and performs flat frame correction for the measurement data similarly. Then, measurement data $I_r$ after ambient light removal correction is obtained from $I-I_a$. In addition, the optical density D is obtained by $D=-\log(I_r/I_0)$.

As described above, according to the imaging system and the imaging method of the present embodiment, correction for eliminating the influence of ambient light is performed on measurement data based on correction data calculated before the imaging of the subject. Therefore, some pixels of the imaging device do not need to be used as correction pixels. As a result, in the imaging system using the transmission light source, it is possible to suppress the influence of ambient light without reducing the imaging area on the imaging device.

Second Embodiment

Next, a second embodiment will be described. In the imaging system and the imaging method according to the first embodiment, the opening of the light shielding plate is disposed in a region for which the first correction data is created. On the other hand, the imaging system and the imaging method according to the present embodiment are different from those of the first embodiment mainly in that the light shielding plate is disposed in a region for which the first correction data is created. Accordingly, detailed explanations of the same components as in the first embodiment will be omitted as long as there is no particular need.

As in the first embodiment, the imaging system of the present embodiment is configured to include the imaging apparatus 10 and the imaging control device 100.

Figure 8:
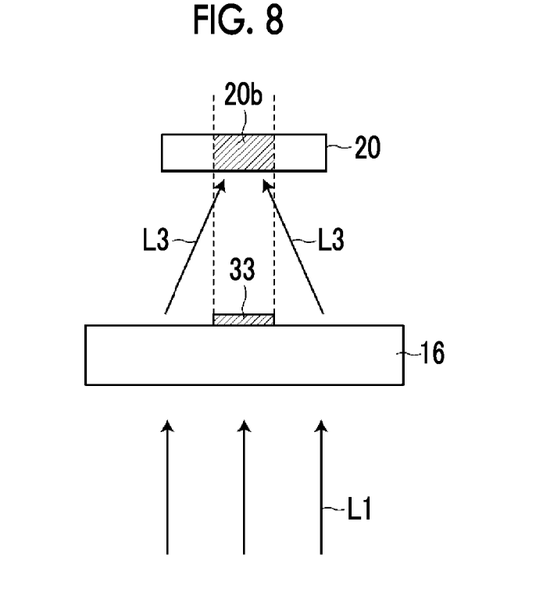
FIG. 8 is a schematic diagram showing how to acquire the third reference data.

As in the first embodiment, the storage unit 110 has first correction data and second correction data. However, the first correction data of the present embodiment is created by the following procedure. As shown in FIG. 8, a light shielding plate 33 is disposed on the stage 16 without placing a subject. The light shielding plate 33 has a size that can cover the area on the stage 16 to create the first correction data. When the illumination light L1 from the transmission light source unit 26 is applied to the stage 16 in this state, the light L3 from the periphery of the light shielding plate 33 is detected in a pixel region corresponding to the light shielding plate 33 (shielding corresponding region 20b). The light L3 is the ambient light itself when viewed from the pixel in the shielding corresponding region. Therefore, the signal strength $I_3$ of the light L3 can be used as the first correction data.

The procedure after creating the first correction data in the imaging method of the present embodiment is the same as that of the first embodiment.

As described above, according to the imaging system and the imaging method of the present embodiment, correction for eliminating the influence of ambient light is performed on measurement data based on correction data calculated before the imaging of the subject. Therefore, the same effect as in the first embodiment is achieved.

Other Embodiments

Figure 9A:
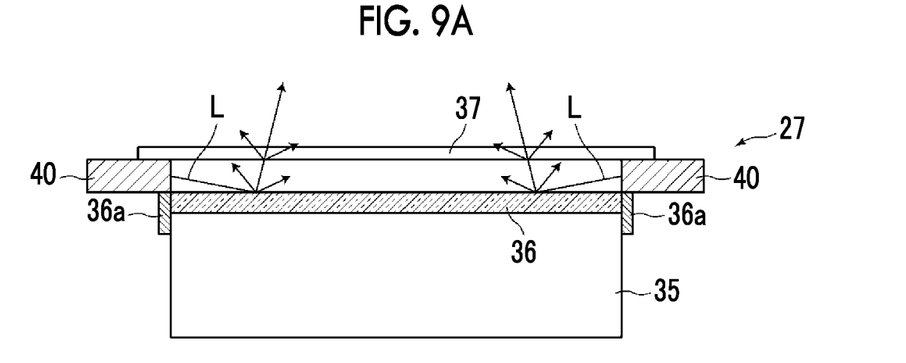
FIGS. 9A and 9B are schematic cross-sectional views showing a modification of a light source.

In an imaging system according to another embodiment of the present invention, for example, a transmission light source unit 27 shown in FIG. 9A can also be used. The transmission light source unit 27 includes an ultraviolet light transmission light source 35, a reflective diffusion plate 36, two white LED light source units 40, and a white transmissive diffusion plate 37.

The ultraviolet light transmission light source 35 is an excitation light source at the time of fluorescence observation, and it is possible to use a commercially available light source without being limited in particular. The reflective diffusion plate 36 is fixed to the upper surface of the ultraviolet light transmission light source 35 by a guide 36a. The reflective diffusion plate 36 transmits ultraviolet light, and reflects white light. A surface of the reflective diffusion plate 36 on the imaging unit side is roughened, so that light from the LED light source unit 40 that propagates almost in parallel to the surface is reflected and diffused.

Figure 9B:
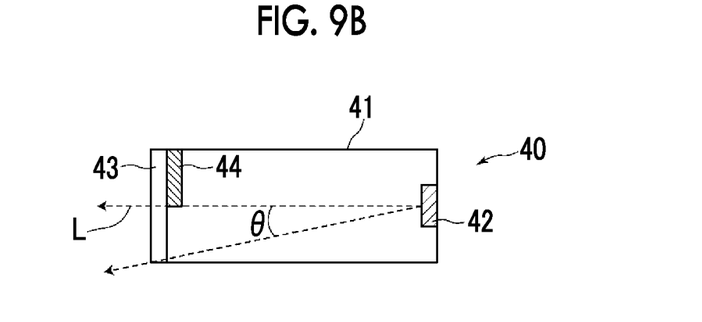

The LED light source unit 40 is configured to include a light sleeve 41, a white LED 42, a sleeve cover 43, and a light shielding member 44. The LED light source unit 40 is disposed at both ends of the reflective diffusion plate 36 so that the optical axis of the white LED 42 is almost parallel to the surface of the reflective diffusion plate 36. For example, three white LEDs 42 are disposed on each of the left and right sides, and are arranged at equal distances (for example, 110 mm) in a direction perpendicular to the plane of FIG. 9B. The sleeve cover 43 is preferably formed of a glass material in consideration of the point of suppressing the autofluorescence when turning on the ultraviolet light transmission light source and the chemical resistance. The material of the sleeve cover 43 is general-purpose white glass, for example, Pyrex (registered trademark) or B270. The light shielding member 44 shields light directed upward to prevent the light from being directly emitted to the subject. The irradiation angle θ when the presence of the light shielding member 44 of the LED light source is taken into consideration is preferably about 15°.

In order to secure the space through which light L from the LED light source propagates, the white transmissive diffusion plate 37 is provided so as to be separated from the reflective diffusion plate 36. The light L from the LED light source repeats reflection and diffusion while propagating through the gap (for example, 20 mm) between the reflective diffusion plate 36 and the white transmissive diffusion plate 37, and is used as illumination light. In consideration of the ease of cleaning and the chemical resistance, a white vinyl chloride plate is preferably used, and the surface is preferably subjected to matte finish.

By using the transmission light source unit 27 having such a configuration, excitation light for fluorescence observation and white light can be used as illumination light through appropriately switching therebetween.

As a wavelength switchable light source, for example, a light source unit including a conversion plate capable of converting ultraviolet light into visible light can be provided between the ultraviolet light source and the stage 16, in addition to the configuration of the transmission light source unit 26. If the conversion plate is made movable so that the conversion plate is located between the ultraviolet light source and the stage 16 when necessary, switching between ultraviolet light and visible light can be realized.

In the imaging system of the invention, it is preferable that the light source unit emits three or more kinds of light (for example, R, G, and B) having different wavelengths. In this case, it is possible to generate color data or a color image of the subject by combining measurement data obtained using the respective light components. For example, in the transmission light source unit 27 described above, it is preferable to use LEDs of R, G, and B instead of the white LED 42. In this case, it is preferable to display a monochrome image and a color image on the display unit 106 simultaneously or alternately.

What is claimed is:

1. An imaging system that images a subject by irradiating the subject with light and detecting light transmitted through the subject, comprising:
   a light source unit;
   a sensor that detects light emitted from the light source unit;
   a storage that stores first correction data calculated based on a difference between first reference data and second reference data, the first reference data being detected by emitting the light with a light shielding plate having an opening placed between the light source unit and the sensor unit and being detected in an opening corresponding region, which is a region in a detection surface of the sensor unit corresponding to the opening of the shielding plate, the second reference data being detected in the opening corresponding region by emitting the light without placing the light shielding plate; and
   a signal processor programmed to perform first correction of eliminating an influence of ambient light for measurement data, which is obtained by measurement using the subject, based on the first correction data,
   wherein the storage further stores second correction data for correcting light intensity distribution according to an irradiation position of the light, and
   the signal processor performs second correction of eliminating an influence of the light intensity distribution for the measurement data based on the second correction data before the first correction.

2. The imaging system according to claim 1,
   wherein the storage stores a plurality of pieces of the first correction data corresponding to divided regions of a plate on which the subject is placed, and
   the signal processor performs the first correction for each piece of the measurement data obtained in each divided region.

3. The imaging system according to claim 1, further comprising the light shielding plate.

4. The imaging system according to claim 3,
   wherein the light shielding plate has a plurality of openings.

5. The imaging system according to claim 1,
   wherein the light source unit includes:
   a light source that emits the light sideways with respect to a direction of the detection surface;
   a reflective diffusion plate that reflects and diffuses the light emitted from the light source toward the sensor unit; and
   a transmissive diffusion plate disposed between the reflective diffusion plate and the sensor unit.

6. The imaging system according to claim 1,
   wherein the light source unit includes:
   a light source that emits the light toward the detection surface; and
   a transmissive diffusion plate provided between the light source and the sensor.

7. The imaging system according to claim 1,
   wherein the signal processor calculates an optical density of the subject based on measurement data for which the first correction has been performed.

8. The imaging system according to claim 1,
   wherein the light source unit emits three or more kinds of the light having different wavelengths, and
   the signal processing unit generates color data or a color image of the subject by combining measurement data obtained using the respective light beams.

9. An imaging system that images a subject by irradiating the subject with light and detecting light transmitted through the subject, comprising:
   a light source unit;
   a sensor that detects light emitted from the light source unit;
   a storage that stores first correction data calculated based on a difference between first reference data and second reference data, the first reference data being detected by emitting the light with a light shielding plate having an opening placed between the light source unit and the sensor unit and being detected in an opening corresponding region, which is a region in a detection surface of the sensor unit corresponding to the opening of the shielding plate, the second reference data being detected in the opening corresponding region by emitting the light without placing the light shielding plate; and
   a signal processor programmed to perform first correction of eliminating an influence of ambient light for measurement data, which is obtained by measurement using the subject, based on the first correction data,
   wherein the light source unit includes,
   a light source that emits the light toward the detection surface; and
   a transmissive diffusion plate provided between the light source and the sensor,
   wherein the light source is an ultraviolet light source, and
   wherein the light source unit includes a conversion plate that converts ultraviolet light into visible light, the conversion plate being provided between the light source and the transmissive diffusion plate.

10. An imaging method for imaging a subject by irradiating the subject with light and detecting light transmitted through the subject, comprising:
    performing first correction of eliminating an influence of ambient light for measurement data, which is obtained by measurement using the subject, based on first correction data calculated based on a difference between first reference data and second reference data, the first reference data being detected by emitting the light from a light source unit with a light shielding plate having an opening placed between a light source unit and a sensor unit and being detected in an opening corresponding region, which is a region in a detection surface of the sensor unit corresponding to the opening of the shielding plate, the second reference data being detected in the opening corresponding region by emitting the light from the light source unit without placing the light shielding plate,
    wherein second correction of eliminating an influence of light intensity distribution is performed for the measurement data based on second correction data for correcting the light intensity distribution according to an irradiation position of the light, and
    the first correction is performed for the measurement data for which the second correction has been performed.

11. The imaging method according to claim 10, further comprising calculating the first correction data.

12. The imaging method according to claim 11,
wherein a plurality of pieces of the first correction data are calculated corresponding to divided regions of a plate on which the subject is placed, and
the first correction is performed for each piece of the measurement data obtained in each divided region.

13. The imaging method according to claim 11,
wherein, when acquiring the first and second reference data, a semi-light shielding plate having a known optical density is disposed at a position corresponding to the opening corresponding region.

* * * * *